June 12, 1951  J. M. HARRIS  2,556,808
BARBECUE BROILER

Filed March 11, 1948  3 Sheets-Sheet 1

James M. Harris
INVENTOR.

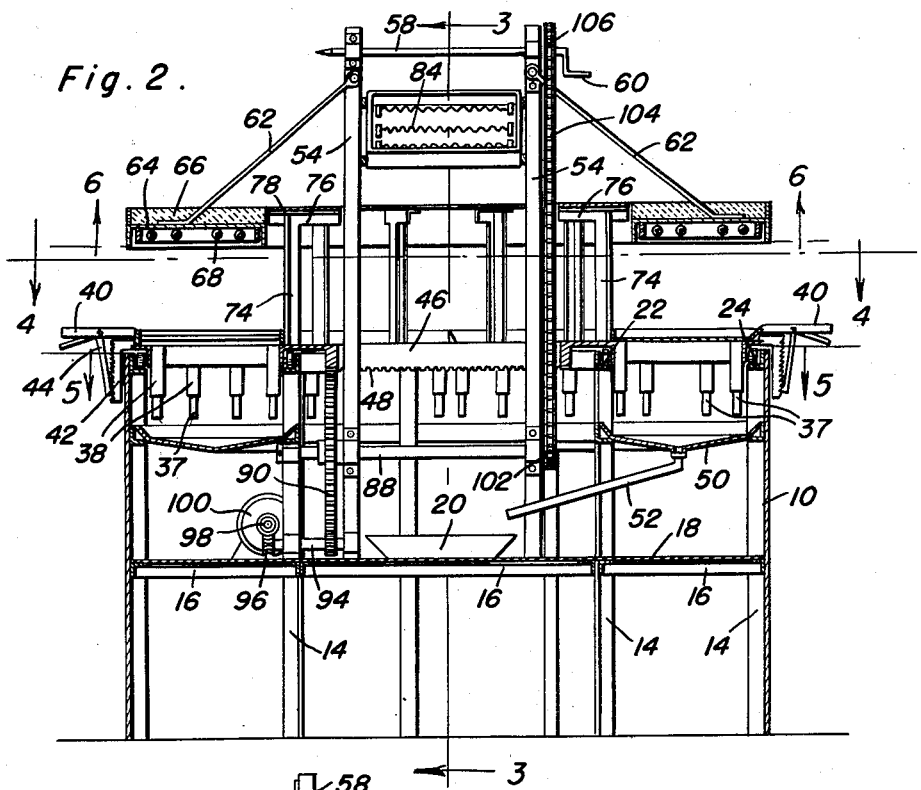

June 12, 1951     J. M. HARRIS     2,556,808
BARBECUE BROILER

Filed March 11, 1948     3 Sheets-Sheet 3

James M. Harris
INVENTOR.

Patented June 12, 1951

2,556,808

UNITED STATES PATENT OFFICE 2,556,808

BARBECUE BROILER

James M. Harris, Huntington Park, Calif.

Application March 11, 1948, Serial No. 14,219

3 Claims. (Cl. 99—423)

This invention comprises novel and useful improvements in a barbecue broiler and more specifically pertains to a rotisserie or barbecue machine wherein the operation of the barbecue, and the broiling of meat is at all times open to visual inspection and to easy access.

The principal object of this invention is to provide a barbecue machine having provision for barbecuing meat, and broiling or grilling chicken or other meat therein.

A further object of the invention is to provide an apparatus as set forth in the preceding objects wherein the operation of the broiler and of the barbecue is at all times open to inspection to thereby promote and provoke interest in the apparatus and in its cooked products.

A still further object of the invention is to provide a barbecue apparatus in accordance with the preceding objects wherein provision is made for selectively adjusting the various meat holders with reference to the source of heat of the apparatus.

An important feature of the invention resides in providing a barbecue machine having an annular casing, with a rotatable carriage supported thereon, which carriage is provided with individually adjustable alternate barbecue pans and meat grills, rotatably positioned beneath an annular source of heat carried by the frame of the machine.

A further important feature of the invention resides in the provision of a rotatable table which is supported immediately next the source of heat, which table is rotatable for displaying cooked meats placed thereon, and for warming the same.

A still further feature of the invention resides in the provision of an annular drip pan disposed below the meat holders and their rotatable carriage, which drip pan discharges into a central grease collecting dish or vat.

A still further feature of the invention resides in the provision of a pair of standards for supporting a barbecue spit above the central portion of the apparatus, and for supporting a heating means in juxtaposition to said spit, and wherein the spit and heating means are rotatable in synchronization with the meat holders' carriage and the table structure.

A still further feature of the invention resides in the provision of the mounting of the spit in such manner that the grease dripping from the meat barbecued thereon may be collected in the above mentioned grease vat or grease pan for ultimate disposition as desired.

And a final important feature of the invention to be specifically enumerated herein resides in the provision of an improved mechanism for rotating the meat holder carriage, the table and the barbecue spit from a common source of power.

These, together with various ancillary features and objects of the invention which will later become apparent as the following description proceeds, are attained by this device, a preferred embodiment of which has been illustrated by way of example only in the accompanying drawings, wherein:

Figure 2 is a vertical central sectional view of the device shown in Figure 1;

Figure 3 is a vertical central sectional view taken substantially at right angles to Figure 2 and upon the plane of the section line 3—3 of Figure 2, portions of the device being omitted therefrom;

Figure 1:
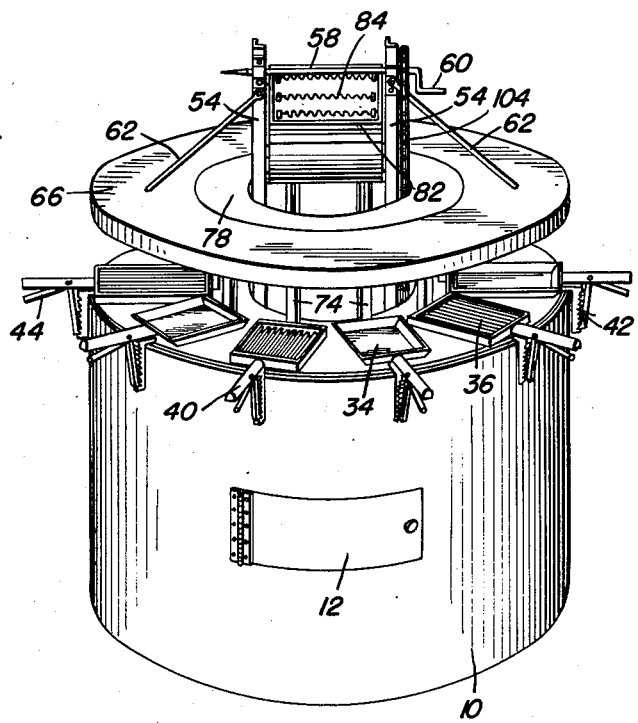
Figure 1 is a perspective view of a preferred embodiment of the invention.

Referring now to the accompanying drawings, wherein like numerals designate similar parts throughout the several views, attention is given first to Figures 1, 2 and 3, wherein 10 designates an annular casing of the machine which may be of any suitable material such as sheet metal or the like, and which at any convenient position thereon is provided with a hinged door 12 for obtaining access to the interior thereof.

The casing is composed of a plurality of vertical supports 14 which may be of angle iron or other suitable construction, and to which are secured upon the inner surface thereof a plurality of horizontally disposed transverse frame members 16 upon which is mounted a partition 18 for supporting the motor for rotating the various parts of the machine, together with a centrally disposed grease collecting pan or vat 20. The door 12 is provided to give access to the interior of the casing above the partition 18 for removing the vat 20 and discharging the contents thereof, and for servicing the parts within the machine as required.

Figure 5:
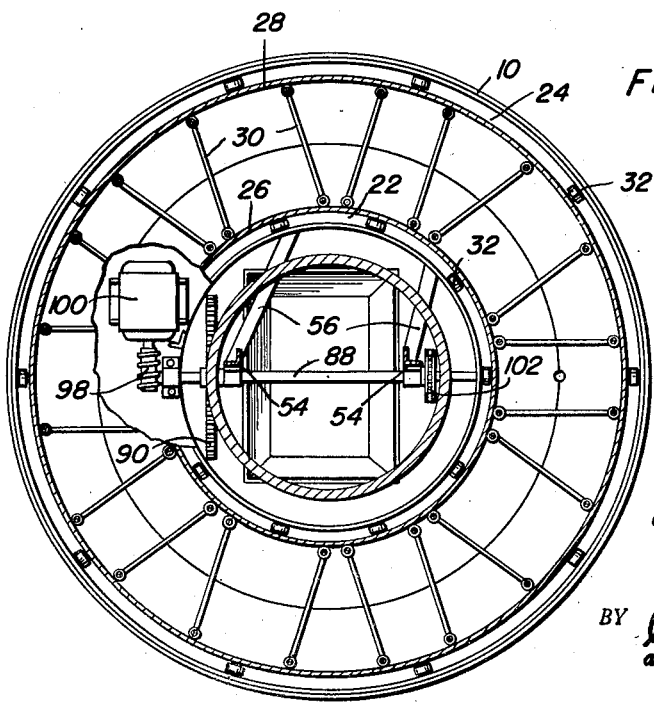
Figure 5 is a further horizontal sectional view taken substantially upon the plane of the section line 5—5 of Figure 2.

It should be here noted that the vertical standards 14 are arranged in two concentric circles, and a pair of concentric annular tracks 22 and 24, of L-shaped cross-section are carried by the upper ends of the standards 14. A rotatable meat holding carriage is mounted upon the annular tracks 22 and 24, and as shown in Figure 5, this carriage comprises annular inner and outer members 26 and 28 which are rigidly secured together as by reinforcing members 30.

A plurality of rollers 32 are journalled upon the carriage members 26 and 28 for rotatably supporting the carriage upon the inner and outer annular tracks 22 and 24. Supported between the carriage members 26 and 28 are a plurality of alternately arranged cast iron barbecuing trays and broiling grills 34 and 36 respectively, see Figure 1. These trays and grills constitute meat holders by means of which chicken, roasts or the like may be mounted upon the machine for broiling as set forth hereinafter; and these holders are vertically adjustable upon their supporting carriage, by means of depending corner rods 37 carried at each of the four corners of the trays and grills, which rods are slidably received in vertical tubular guides 38 extending through the carriage members 26 and 28 for vertical movement with respect to the carriage. At their outer ends, each of the holders 34 and 36 is provided with an integral handle 40 by means of which the holder may be raised or lowered, the depending rods 38 constituting guides for permitting this vertical adjusting movement. A ratchet plate 42 is secured to the outer carriage member 28 immediately below each of the handles 40, and cooperates with a pawl 44 consisting of an L-shaped lever pivoted to the handle 40 intermediate its ends and having a toothed lower end which is engageable selectively with the teeth of the ratchet plates. By means of this ratchet and pawl, it will be seen that each of the trays or grills may be individually raised or lowered with respect to its supporting carriage, and is rotatable therewith as set forth hereinafter.

As shown more clearly in Figures 2 and 3, the innermost member 26 of the carriage provides a central open space, for a purpose to be later set forth, and at its inner marginal edge is provided with a downturned flange 46 whose lower surface constitutes a ring gear having teeth 48 by means of which the carriage is rotated as set forth hereinafter.

Secured between the inner and outer circles of vertical standards 14, and immediately below the rotatable carriage, is an annular drip pan 50 having a depressed annular central portion from which extends at any suitable point a drain pipe 52 whose lower end discharges into the above mentioned grease pan or vat 20. It will thus be seen that the meat juices and grease dripping from the broiled meat, will pass through the grills 36 and be collected in the annular pan 50, for discharge into the grease collecting vat 20; while suitable drain means, not shown, may be provided in each of the trays or pans 34 for selectively discharging the grease and juices therefrom likewise into the annular collecting trough 50.

Figure 6:
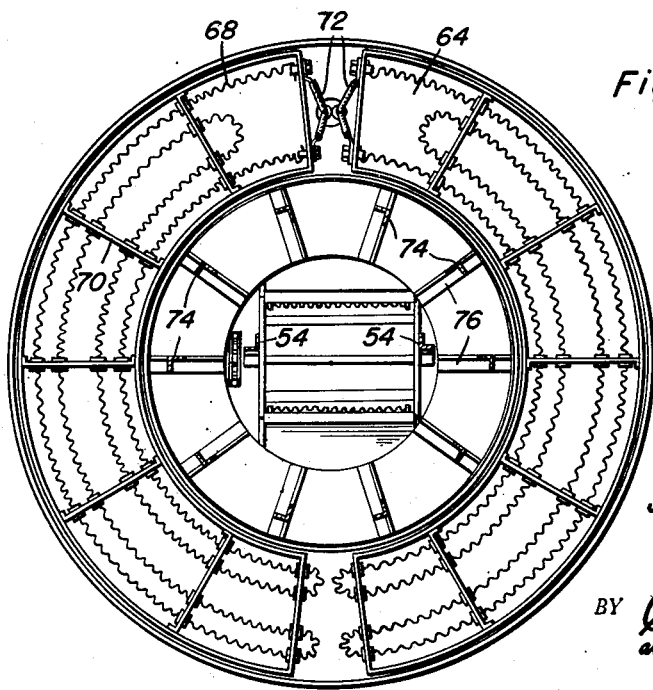
Figure 6 is a horizontal sectional view taken substantially upon the plane of the section line 6—6 of Figure 2.
Figure 4:
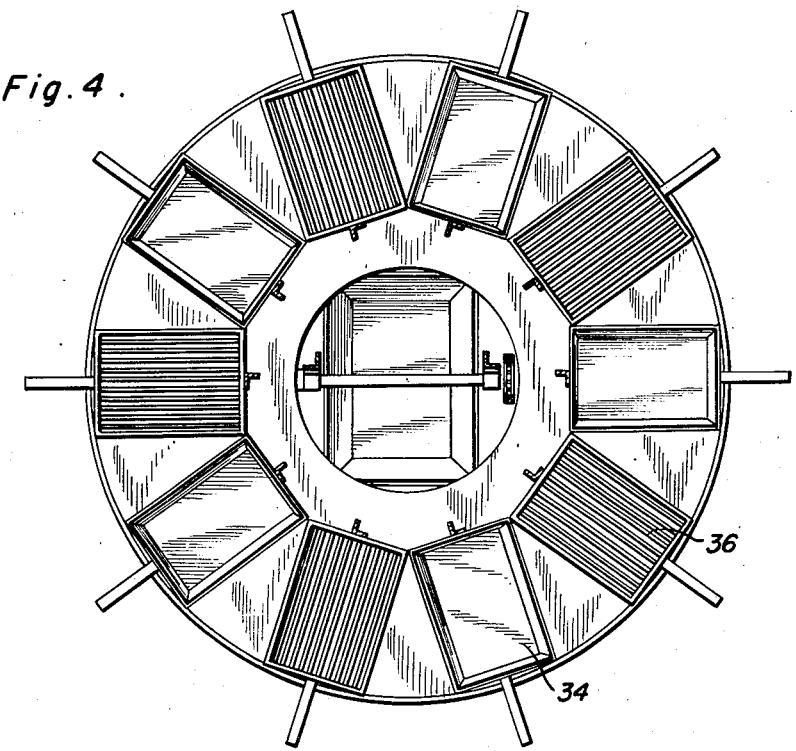
Figure 4 is a horizontal sectional view taken substantially upon the plane of the section line 4—4 of Figure 2.

Centrally mounted on the partition 18 are a pair of vertical standards 54 which as shown best in Figure 5 may be of angle iron construction, and which extend upwardly through the circular opening in the rotatable carriage and inside the ring gear 46 thereof, which standards are braced as by transverse members 56 from the inner row of vertical supports 14, to provide a stationary and rigid supporting structure. These standards rise above the upper end of the entire machine, and detachably journal a horizontally extending spit 58 provided with a manual crank 60. Supported from the standards 54 as by rods 62, is an annular channel-shaped member 64 whose upper surface is covered by a refractory heat resistant material 66, and which has mounted on its lower surface any suitable source of heat, such as an electrical resistance wire 68, or if desired, gas burners or the like. The resistance wire 68 is shown best in Figure 6 mounted upon suitable refractory supports 70 and has its terminals connected by electrical conductors 72 to any suitable source of current and in any suitable manner. It should be particularly noted that the annular member 64 directly overlies the meat holder carrier whereby the meat placed upon the grill or tray holders of the carrier is subjected to a broiling action as the meat holder carrier is rotated below the annular source of heat. Obviously, by raising or lowering individual meat holders as above set forth, their distance may be varied from the source of heat, and the nature and extent of the broiling action may be thus easily regulated and controlled.

Extending upwardly from the innermost annular member 26 of the carriage are a plurality of vertical supports 74 having their upper ends extended laterally as at 76 for supporting an annular shelf or table 78 thereon, which shelf or table thus rotates with the carriage for supporting and displaying trays of cooked meat products for inspection and for serving portions therefrom.

As shown more clearly in Figure 3, each of the standards 54 supporting the barbecue spit 58, is provided with a pair of laterally extending support arms 80, between the ends of which are secured longitudinally extending concave heating members 82 in which are supported a plurality of electrical heating elements 84 or subjecting a portion of meat carried by the spit 58 to a barbecuing action.

As will be seen, the sources of heat 82 are spaced laterally from the supporting standards 54 and are disposed in parallel relation to the spit 58, but on opposite sides thereof, whereby any grease or fat dripping down from the meat rotated by the spit and heated by the members 82, will pass through the above mentioned central opening between the rotatable shelf 78, and the annular flange 46 of the carriage, and be collected in the grease vat 20.

Obviously, any suitable electrical circuits for heating the resistance element 84, or any suitable means for supplying other fuel to the heating agencies within the members 82 may be employed. It is of course contemplated that the intensity of the heat supplied to either of the elements 82 or 68, shall be regulated and controlled by the operator of the machine in accordance with various conditions of use.

As will be seen best by reference to Figures 2, 3 and 5, there is journalled above the partition 18 upon the vertical support standards 54 as by journal bearings 86, a transversely disposed shaft 88 having a gear 90 thereon enmeshed with the ring gear teeth 48, which gear 90 is in turn engaged by a driving gear 92 on one end of a shaft 94 suitably journalled upon the frame members of the casing of the machine. At its other end, the lay-shaft 94 is provided with a gear 96 constantly in mesh with the worm gear 98 on the end of the armature shaft of a motor 100 suitably mounted upon the partition 18. The motor obviously is controllable in any suitable manner for regulating the speed thereof.

At its other extremity, the shaft 88 is provided with a sprocket wheel 102 and a sprocket 104 is entrained over this cog wheel and also over a similar sprocket wheel 106 carried by the spit 58, whereby upon operation of the motor 100, the spit may be automatically rotated in unison with rotation of the meat holder carriage, and of the annular shelf 78 supported thereby.

As will be obvious, upon rotation of the handle 60, the spit 58 may be turned, and also by means of the sprocket chain 104 and the associated gearing, the device may be manually rotated to any desired position.

From the foregoing it will be seen that there has been provided a barbecue machine wherein meat may be selectively barbecued upon a spit, barbecued in trays or pans, and broiled upon grills as desired and simultaneously upon operation of the machine. Further, it will be seen that the individual meat holders may be selectively adjusted to vary the position of the individual trays or grills with respect to the source of heat, in order to adequately control the broiling of each individual item.

From the foregoing it is believed that the manner of constructing and operating the device with its manifest advantages will be readily understood and accordingly, further explanation thereof is believed to be unnecessary. However, since numerous modifications and changes will readily occur to those skilled in the art after a consideration of the foregoing specification and accompanying drawings, it is not intended to limit the invention to the exact construction shown and described, but all suitable modifications and equivalents may be resorted to falling within the scope of the appended claims.

Having thus described the invention what is claimed as new is:

1. A barbecue machine comprising a casing, a carriage rotatable upon said casing, a plurality of meat supports on said carriage, a source of heat supported by said casing and overlying said carriage, an electric motor in said casing, a gearing assembly connecting said motor with said carriage, said meat supports being individually and vertically adjustable upon said carriage, said meat supports having guide rods vertically slidable in said carriage, a handle on each meat support for elevating the same and a locking means for securing the meat supports in vertically adjusted position.

2. A barbecue machine comprising a casing having annular tracks on its upper edge, a carriage rotatably mounted on said casing including annular members journaled in said tracks, a plurality of meat supports on said carriage, said meat supports having guide rods vertically slidable in said carriage, a handle on each meat support for elevating the same, locking means for securing said meat holders in vertically adjusted position secured to said handle and said carriage, and a source of heat supported by said casing and overlying said carriage.

3. A barbecue machine comprising a casing having annular tracks on its upper edge, a carriage rotatably mounted on said casing including inner and outer annular members journaled in said tracks, the inner annular member having an annular down-turned flange, a ring gear on said flange, a plurality of meat supports on said carriage, said meat supports having guide rods vertically slidable in said carriage, a handle on each meat support, locking means for securing said meat holders in vertically adjusted position secured to said handle and said carriage, a source of heat supported by said casing and overlying said carriage, a prime mover supported by said casing, and a gearing assembly connecting said prime mover with said ring gear.

JAMES M. HARRIS.

REFERENCES CITED

The following references are of record in the file of this patent:

UNITED STATES PATENTS

| Number | Name | Date |
| --- | --- | --- |
| 814,540 | Higbee | Mar. 6, 1906 |
| 1,422,835 | Condy | July 18, 1922 |
| 1,605,143 | Renfroe | Nov. 2, 1926 |
| 1,631,655 | Sunderland et al. | June 7, 1927 |
| 1,731,743 | Harrison | Oct. 15, 1929 |
| 1,771,762 | Allwine | July 29, 1930 |
| 1,853,319 | Polhemus | Apr. 2, 1932 |
| 1,854,850 | Linkenauger | Apr. 19, 1932 |
| 1,992,861 | Demos | Feb. 26, 1935 |
| 2,097,471 | Scharsch | Nov. 2, 1937 |
| 2,211,900 | Leanitt | Aug. 20, 1940 |
| 2,259,073 | McGlaughlin | Oct. 14, 1941 |
| 2,438,699 | Groetchen | Mar. 30, 1948 |
| 2,482,601 | Spartalis | Sept. 20, 1949 |